United States Patent
Xue et al.

(10) Patent No.: US 11,452,085 B2
(45) Date of Patent: Sep. 20, 2022

(54) RADIO COMMUNICATIONS IN NARROWBAND REGIONS OF UNLICENSED SPECTRUM

(71) Applicant: QUALCOMM Incorporated, San Diego, CA (US)

(72) Inventors: Yisheng Xue, San Diego, CA (US); Xiaoxia Zhang, San Diego, CA (US); Aleksandar Damnjanovic, Del Mar, CA (US); Jing Sun, San Diego, CA (US); Qingjiang Tian, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 16/941,294

(22) Filed: Jul. 28, 2020

(65) Prior Publication Data

US 2021/0045096 A1 Feb. 11, 2021

Related U.S. Application Data

(60) Provisional application No. 62/883,607, filed on Aug. 6, 2019.

(51) Int. Cl.
*H04W 72/04* (2009.01)
*H04W 74/08* (2009.01)
*H04W 16/14* (2009.01)

(52) U.S. Cl.
CPC ......... *H04W 72/042* (2013.01); *H04W 16/14* (2013.01); *H04W 74/0833* (2013.01)

(58) Field of Classification Search
CPC ...... H04L 5/001; H04L 5/0048; H04W 16/14; H04W 72/042; H04W 74/002; H04W 74/0808; H04W 74/0833
See application file for complete search history.

(56) References Cited

U.S. PATENT DOCUMENTS 9,031,019 B2 * 5/2015 Kim .................. H04W 74/0833
370/280
9,532,383 B2 * 12/2016 Lee .................... H04W 74/0833
(Continued)

FOREIGN PATENT DOCUMENTS

CN 103354458 B * 6/2016 ............. H04B 1/40
CN 110235473 A * 9/2019 ............. H04L 67/12
(Continued)

OTHER PUBLICATIONS

International Search Report and Written Opinion—PCT/US2020/043989—ISAEPO—dated Oct. 14, 2020.
(Continued)

*Primary Examiner* — Eric Nowlin
(74) *Attorney, Agent, or Firm* — Patterson & Sheridan, LLP

(57) ABSTRACT

Certain aspects of the present disclosure provide techniques for new radio (NR) communications in narrowband regions of unlicensed spectrum. A method that may be performed by a user equipment (UE) includes determining, using an energy detector (ED), that received energy in a first bandwidth (BW) is lower than a threshold; and transmitting, in response to determining that received energy in the first BW is lower than the threshold, a first uplink (UL) transmission to a base station (BS) in a second BW smaller than the first BW and contained within the first BW.

27 Claims, 7 Drawing Sheets

(56) References Cited

U.S. PATENT DOCUMENTS

| | | | |
|---|---|---|---|
| 10,028,106 B2* | 7/2018 | Madhav | H04W 4/40 |
| 10,554,366 B2* | 2/2020 | Lin | H04W 74/0833 |
| 10,856,320 B2* | 12/2020 | Jung | H04W 72/0453 |
| 10,925,091 B2* | 2/2021 | Zhang | H04W 72/0446 |
| 11,026,266 B2* | 6/2021 | Kurth | H04W 48/10 |
| 11,057,921 B2* | 7/2021 | Papasakellariou | H04W 72/1289 |
| 11,108,525 B2* | 8/2021 | Lin | H04L 27/2613 |
| 11,240,672 B2* | 2/2022 | Thubert | H04B 17/354 |
| 11,272,526 B2* | 3/2022 | Chakraborty | H04W 72/1289 |
| 2013/0077582 A1* | 3/2013 | Kim | H04W 74/006 370/329 |
| 2016/0100422 A1* | 4/2016 | Papasakellariou | H04W 72/1289 370/329 |
| 2016/0198310 A1* | 7/2016 | Chalmers | G01S 19/14 455/456.1 |
| 2016/0219130 A1* | 7/2016 | Ghosh | H04L 69/22 |
| 2016/0255616 A1* | 9/2016 | Martin | H04W 72/048 370/330 |
| 2018/0219663 A1* | 8/2018 | Lin | H04W 74/0866 |
| 2019/0190668 A1* | 6/2019 | Lei | H04L 5/0046 |
| 2019/0230706 A1* | 7/2019 | Li | H04W 72/0453 |
| 2019/0305899 A1* | 10/2019 | Rico Alvarino | H04L 1/0047 |
| 2019/0313437 A1* | 10/2019 | Jung | H04W 74/006 |
| 2019/0342915 A1* | 11/2019 | Kim | H04L 27/2613 |
| 2019/0349969 A1* | 11/2019 | Chakraborty | H04W 56/0015 |
| 2019/0357270 A1* | 11/2019 | Kurth | H04W 74/0833 |
| 2020/0112413 A1* | 4/2020 | Lin | H04W 72/0486 |
| 2021/0029678 A1* | 1/2021 | Liu | H04L 5/0094 |
| 2021/0045096 A1* | 2/2021 | Xue | H04W 74/0833 |
| 2021/0105819 A1* | 4/2021 | Takeda | H04W 72/04 |
| 2021/0144757 A1* | 5/2021 | Fazili | H04W 74/0808 |
| 2021/0152318 A1* | 5/2021 | Park | H04W 74/0833 |
| 2022/0060303 A1* | 2/2022 | Lin | H04L 5/0053 |

FOREIGN PATENT DOCUMENTS

| | | | | |
|---|---|---|---|---|
| CN | 110235473 B | * | 11/2021 | H04L 67/12 |
| EP | 3552435 B1 | * | 9/2020 | H04L 67/12 |
| WO | WO-2018138328 A1 | * | 8/2018 | H04L 67/12 |
| WO | WO-2020029295 A1 | * | 2/2020 | |
| WO | WO-2019088670 A9 | * | 4/2020 | H04L 27/2605 |
| WO | WO-2021206409 A1 | * | 10/2021 | |

OTHER PUBLICATIONS

Qualcomm Incorporated: "Channel Access Procedures for NR Unlicensed," 3GPP Draft, 3GPP TSG RAN WG1 Meeting #97, R1-1907261, 7.2.2.2.1, Channel Access Procedures for NR Unlicensed, 3rd Generation Partnership Project (3GPP), Mobile Competence Centre, 650, Route Des Lucioles, F-06921, Sophia-Antipolis Cedex, France, vol. RAN WG1, No. Reno, US; May 13, 2019-May 17, 2019, May 4, 2019 (May 4, 2019), XP051728701, 18 Pages, http://www.3gpp.org/ftp/Meetings%5F3GPP%5FSYNC/RAN1/Docs/R1%2D1907261%2Ezip.

Qualcomm Incorporated: "Configuration and Selection for RACH Resources",3GPP Draft; 3GPP TSG-RAN WG2 Meeting #106, R2-1906331 Configuration and Selection for RACH Resources, 3rd Generation Partnership Project (3GPP), Mobile Competence Centre, 650, Route Des Lucioles; F-06921 Sophia-Antipolis Cedex, F, vol. RAN WG2, No. Reno, NV, USA, May 13, 2019-May 17, 2019, May 13, 2019 (May 13, 2019), XP051729798, 6 Pages, http://www.3gpp.org/ftp/Meetings%5F3GPP%5FSYNC/RAN2/Docs/R2%2D1906331%2Ezip.

Qualcomm Incorporated: "Initial Access and Mobility Procedures for NR Unlicensed", 3GPP Draft, 3GPP TSG RAN WG1 Meeting #97, R1-1907262 7.2.2.2.2 Initial Access and Mobility Procedures for NR-U, 3rd Generation Partnership Project (3GPP), Mobile Competence Centre, 650, Route Des Lucioles; F-06921 Sophia-Antipol, vol. RAN WG1, No. Reno, US, May 13, 2019-May 17, 2019, May 13, 2019 (May 13, 2019), XP051728702, pp. 1-16, http://www.3gpp.org/ftp/Meetings%5F3GPP%5FSYNC/RAN1/Docs/R1%2D1907262%2Ezip.

* cited by examiner

RADIO COMMUNICATIONS IN NARROWBAND REGIONS OF UNLICENSED SPECTRUM

CROSS-REFERENCE TO RELATED APPLICATIONS

This application claims priority to and the benefit of U.S. Provisional Application No. 62/883,607, filed Aug. 6, 2019, which is expressly incorporated by reference in its entirety as if fully set forth below and for all applicable purposes.

BACKGROUND

Field of the Disclosure

Aspects of the present disclosure relate to wireless communications, and more particularly, to techniques for new radio (NR) communications in narrowband regions of unlicensed spectrum.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication performed by a user equipment (UE). The method generally includes determining, using an energy detector (ED), that received energy in a first bandwidth (BW) is lower than a threshold; and transmitting, in response to determining that received energy in the first BW is lower than the threshold, an uplink (UL) transmission to a base station (BS) in a second BW smaller than the first BW and contained within the first BW.

Certain aspects provide a method for wireless communication performed by a base station (BS). The method generally includes transmitting an indication to a user equipment (UE) that the BS supports UEs that detect received energy in a first bandwidth (BW) and transmit in a second BW smaller than the first BW and contained within the first BW; and receiving an uplink (UL) transmission from the UE in the second BW.

Certain aspects provide an apparatus for wireless communication. The apparatus generally includes means for determining, using an energy detector (ED), that received energy in a first bandwidth (BW) is lower than a threshold; and means for transmitting, in response to determining that received energy in the first BW is lower than the threshold, an uplink (UL) transmission to a base station (BS) in a second BW smaller than the first BW and contained within the first BW.

Certain aspects provide an apparatus for wireless communication. The apparatus generally includes means for transmitting an indication to a user equipment (UE) that a base station (B S) supports UEs that detect received energy in a first bandwidth (BW) and transmit in a second BW smaller than the first BW and contained within the first BW; and means for receiving an uplink (UL) transmission from the UE in the second BW.

Certain aspects provide an apparatus for wireless communication. The apparatus generally includes a memory and at least one processor coupled with the memory. The at least one processor is generally configured to determine, using an energy detector (ED), that received energy in a first bandwidth (BW) is lower than a threshold; and transmit, in response to determining that received energy in the first BW is lower than the threshold, an uplink (UL) transmission to a base station (BS) in a second BW smaller than the first BW and contained within the first BW.

Certain aspects provide an apparatus for wireless communication. The apparatus generally includes a memory and at least one processor coupled with the memory. The at least one processor is generally configured to transmit an indication to a user equipment (UE) that the apparatus supports UEs that detect received energy in a first bandwidth (BW) and transmit in a second BW smaller than the first BW and contained within the first BW; and receive an uplink (UL) transmission from the UE in the second BW.

Certain aspects provide a computer-readable medium storing computer-executable code thereon for wireless communication. The computer-executable code generally includes instructions that, when executed by a processing system, cause the processing system to perform operations generally including determining, using an energy detector (ED), that received energy in a first bandwidth (BW) is lower than a threshold; and transmitting, in response to determining that received energy in the first BW is lower than the threshold, an uplink (UL) transmission to a base station (BS) in a second BW smaller than the first BW and contained within the first BW.

Certain aspects provide a computer-readable medium storing computer-executable code thereon for wireless communication. The computer-executable code generally includes instructions that, when executed by a processing system, cause the processing system to perform operations generally including transmitting an indication to a user equipment (UE) that a base station (BS) supports UEs that detect received energy in a first bandwidth (BW) and transmit in a second BW smaller than the first BW and contained within the first BW; and receiving an uplink (UL) transmission from the UE in the second BW.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
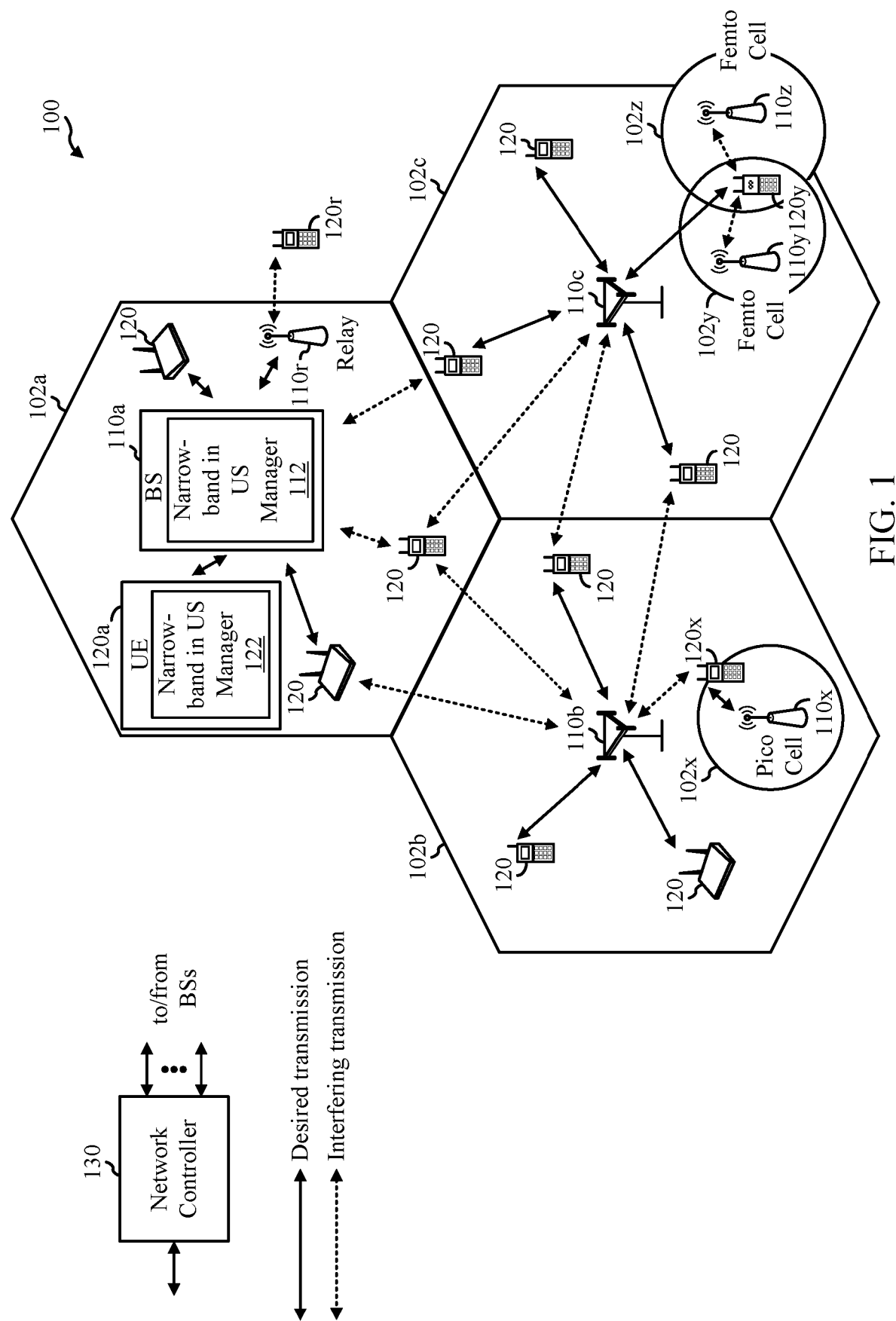
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) communications in narrowband regions of unlicensed spectrum. A typical NR user equipment (UE) is capable of supporting enhanced mobile broadband (eMBB) communications and ultra-reliable low-latency communications (URLLC). However, there are use cases in which a less-capable NR UE would be adequate, and a less-capable NR UE may be less expensive than the typical NR UE. For example, a less-capable NR UE may have a reduced number of transmit and/or receive antennas, operate using a relaxed transmission timeline, transmit with reduced power, and/or transmit and receive on bandwidths smaller than 20 MHz (e.g., 10 MHz or 5 MHz). Less-capable NR UEs may be deployed to operate in unlicensed spectrum (e.g., 5 GHz or 6 GHz frequency bands), similar to licensed assisted access (LAA) and NR on unlicensed spectrum (NR-U) techniques. For co-existence with Wi-Fi networks, devices operating using LAA and/or NR-U are specified to conduct listen-before-talk (LBT) operations over a 20 MHz bandwidth (BW). According to aspects of the present disclosure, techniques are provided for conducting an LBT over a 20 MHz bandwidth with a device that transmits and receives over bandwidths smaller than 20 MHz.

The following description provides examples of new radio (NR) communications in narrowband regions of unlicensed spectrum in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for new radio (NR) communications in narrowband regions of unlicensed spectrum. As shown in FIG. 1, the BS 110a includes a narrowband in unlicensed spectrum (US) manager 112. The narrowband in unlicensed spectrum manager 112 may be configured to transmit an indication to a UE (e.g., UE 120a) that the BS supports UEs that detect received energy in a first bandwidth (BW) and transmit in a second BW smaller than the first BW and contained within the first BW; and to receive an uplink (UL) transmission from the UE in the second BW, in accordance with aspects of the present disclosure. As shown in FIG. 1, the UE 120a includes a narrowband in unlicensed spectrum (US) manager 122. The narrowband in unlicensed spectrum manager 122 may be configured to determine, using an energy detector (ED), that received energy in a first bandwidth (BW) is lower than a threshold; and to transmit, in response to determining that received energy in the first BW is lower than the threshold, a first uplink (UL) transmission to a BS (e.g., BS 110a) in a second BW smaller than the first BW and contained within the first BW, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
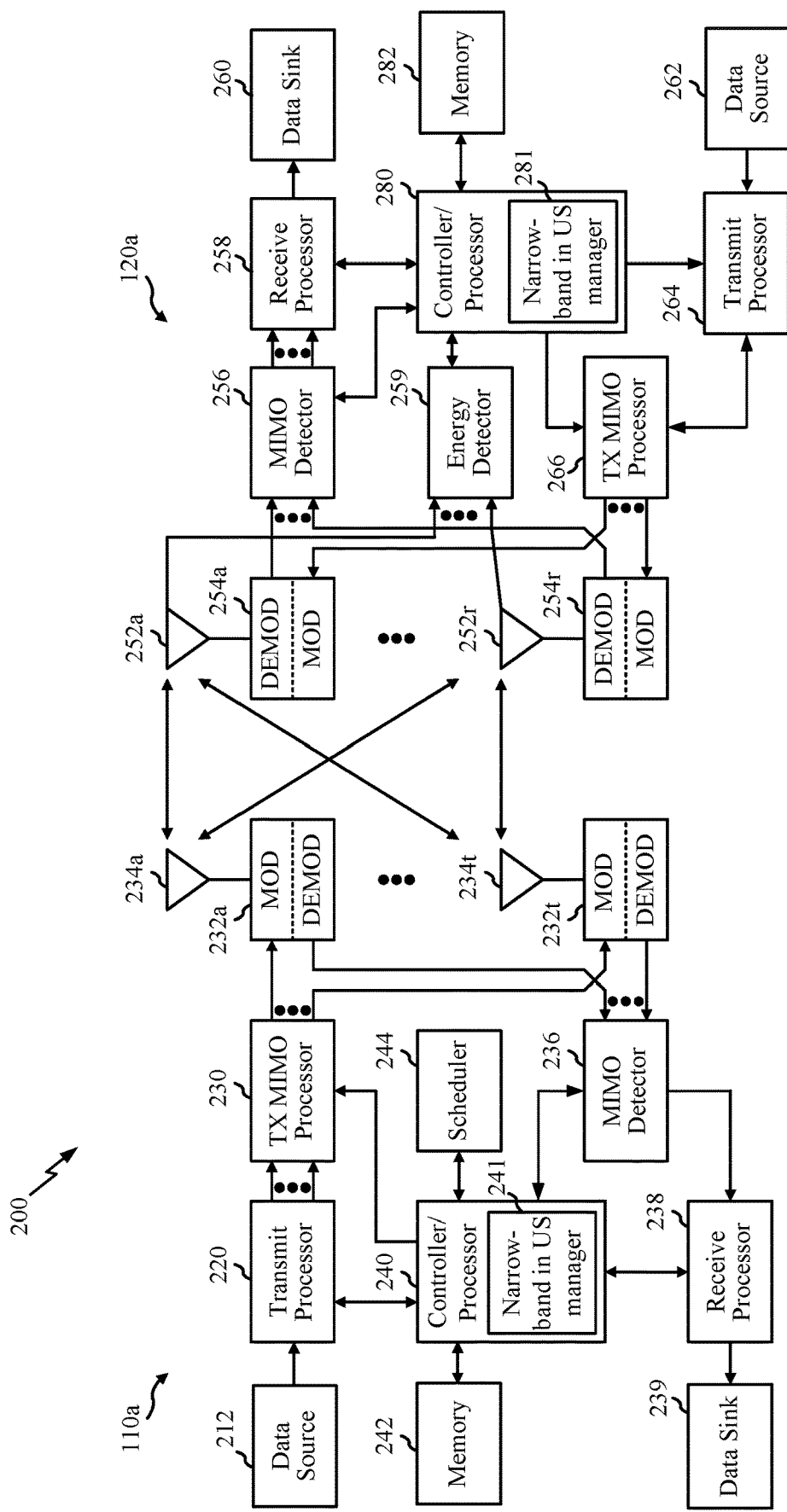
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280. An energy detector 259 may detect received energy, e.g., in a twenty MHz bandwidth.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has a narrowband in unlicensed spectrum (US) manager 241 that may be configured for transmitting an indication to a UE (e.g., UE 120a) that the BS supports UEs that detect received energy in a first bandwidth (BW) and transmit in a second BW smaller than the first BW and contained within the first BW; and for receiving an uplink (UL) transmission from the UE in the second BW, according to aspects described herein. As shown in FIG. 2, the controller/processor 280 of the UE 120a has a narrowband in unlicensed spectrum (US) manager 281 that may be configured for determining, using an energy detector (ED, e.g., energy detector 259), that received energy in a first bandwidth (BW) is lower than a threshold; and for transmitting, in response to determining that received energy in the first BW is lower than the threshold, an uplink (UL) transmission to a BS (e.g., BS 110a) in a second BW smaller than the first BW and contained within the first BW, according to aspects described herein. Although shown at the Controller/Processor, other components of the UE 120a and BS 110a may be used to perform the operations described herein.

A new item named "NR-Lite" is being prepared for 3GPP Release 17 (Rel-17). As mentioned above, a typical NR user equipment (UE) is capable of supporting enhanced mobile broadband (eMBB) communications and ultra-reliable low-latency communications (URLLC). However, there are use cases in which a less-capable NR UE would be adequate, and a less-capable NR UE may be less expensive than the typical NR UE. For example, a less-capable NR UE may have a reduced number of transmit and/or receive antennas, operate using a relaxed transmission timeline, transmit with reduced power, and/or transmit and receive on bandwidths smaller than 20 MHz (e.g., 10 MHz or 5 MHz). Less-capable NR UEs may be deployed to operate in unlicensed spectrum (e.g., 5 GHz or 6 GHz frequency bands), similar to licensed assisted access (LAA) and NR on unlicensed spectrum (NR-U) techniques. For co-existence with Wi-Fi networks, devices operating using LAA and/or NR-U are specified to conduct listen-before-talk (LBT) operations over a 20 MHz bandwidth (BW).

The benefit of narrower (i.e., narrower than 20 MHz) bandwidth operations has previously been pursued by Wi-Fi developers in defining a station (STA) that communicates on a 20 MHz bandwidth in the IEEE 802.11ax communications standard. It was felt that such a station would potentially be useful for Internet of Things (IoT) applications. However, Wi-Fi developers did not attempt to support operations on bandwidths smaller than 20 MHz, because preamble detection (PD) on a 20 MHz bandwidth is a mandatory part of Wi-Fi channel access. That is, a Wi-Fi node (e.g., a STA) is required to read a preamble occupying 20 MHz in order for the Wi-Fi node to not interrupt others in a Wi-Fi network. Similarly, a Wi-Fi node is required to transmit a preamble occupying at least 20 MHz in order to protect its own transmission from interruption by other Wi-Fi transmissions from other nodes. It should be noted that Wi-Fi communications standards do allow for very short uplink transmissions without LBT when a node is triggered in uplink, but the supported data rate for those uplink transmissions can be very limited and the trigger frame that triggers the very short uplink transmissions is itself transmitted in a bandwidth of at least 20 MHz.

Accordingly, techniques and apparatus for determining that a 20 MHz bandwidth is available (e.g., by performing an LBT on the 20 MHz bandwidth) with a device that is not capable of transmitting or receiving on a 20 MHz bandwidth.

Example New Radio Communications in Narrowband Regions of Unlicensed Spectrum

Aspects of the present disclosure provide techniques for a UE to use an energy detector (ED) to determine that received energy in a 20 MHz bandwidth is lower than a threshold and therefore that the 20 MHz bandwidth is available for transmission for the UE. The UE can then transmit on a narrowband region within the 20 MHz bandwidth.

In aspects of the present disclosure, the energy-detection based channel access of NR-U enables a UE with a reduced operating bandwidth to determine if a 20 MHz bandwidth is available for transmissions.

According to aspects of the present disclosure, a UE (which may be referred to as an NR-lite UE) may be equipped with a 20 MHz energy detector when the operating bandwidth of the UE is smaller than 20 MHz. In aspects of the present disclosure, the energy detector can be a simple, low-cost circuit.

In aspects of the present disclosure, the operating bandwidth of a UE may be smaller than a bandwidth in which an ED of the UE can detect energy. The bandwidth in which an ED can detect energy may be referred to herein as the ED bandwidth. The operating bandwidth of a UE may be smaller than the ED bandwidth of the UE because a transceiver (e.g., a receive chain or a transmit chain of the transceiver) of the UE is limited to an operating bandwidth smaller than the ED bandwidth. Limiting the operating bandwidth of a UE may reduce a cost of manufacturing the UE or reduce the power consumption of the UE.

According to aspects of the present disclosure, a more aggressive solution than using a 20 MHz energy detector is for a UE to conduct narrowband energy detection, but with a relatively lower threshold, e.g., −82 dBm instead of the previously known threshold of −72 dBm, for transmitting with 23 dBm of transmission power.)

Although enhanced licensed assisted access (eLAA) and new radio in unlicensed spectrum (NR-U) introduced an interlaced uplink design, wherein nodes transmit on interlaced tones in order to share uplink bandwidth while strictly following the rule of occupancy channel bandwidth (OCB), the adoption of uplink OFDMA with nodes transmitting on blocks of adjacent tones instead of distributed tones in 802.11ax shows that partial BW occupancy is acceptable when the nodes are working together with a reasonable channel access protocol. Thus, it is desirable to deploy NR-Lite with smaller than 20 MHz operating bandwidth in areas where 802.11ax is deployed.

The design of UL OFDMA in 802.11ax is suitable for coexistence with other Wi-Fi networks because an 802.11ax node only transmits on a block of bandwidth smaller than 20 MHz in a scheduled uplink, where an access point (AP) of the network is responsible for scheduling enough STAs on blocks smaller than 20 MHz to occupy a bandwidth of at least 20 MHz.

According to aspects of the present disclosure, techniques are provided that support the same design philosophy of having enough uplink transmissions from UEs on blocks smaller than 20 MHz to occupy a bandwidth of at least 20 MHz.

In aspects of the present disclosure, techniques are provided for deployments of new radio communications networks using narrowband regions of unlicensed spectrum by utilizing UEs operating on bandwidths smaller than 20 MHz and using a 20 MHz energy detector. According to aspects of the present disclosure, a category 4 (CAT4) LBT may be performed (e.g., by a BS) on a 20 MHz bandwidth prior to one or more UEs (with 20 MHz energy detectors) transmitting a random access preamble (i.e., as part of a random access procedure) or a short PUCCH. In aspects of the present disclosure, UEs (with 20 MHz energy detectors) may perform category 2 (CAT2) or category 1 (CAT1) LBT procedures for determining channel occupancy before starting UL data transmissions.

According to aspects of the present disclosure, techniques are provided for deployments of new radio communications networks using narrowband regions of unlicensed spectrum by utilizing UEs operating on bandwidths smaller than 20 MHz and using a <20 MHz RF chain (i.e., the UEs have narrowband energy detectors). The described UEs may have fewer opportunities to complete a CAT4 LBT, due to the reduced bandwidth of the energy detector leading to the UE taking a longer time for energy detection, and that longer time may not be able to satisfy the timing requirement of completing the energy detection within a 9 µs Wi-Fi slot. In aspects of the present disclosure, techniques for a UE with a narrowband energy detector to perform a CAT2 LBT according to a new definition, e.g., a longer energy sensing measurement window, such as longer than 4 µs.

In aspects of the present disclosure, techniques are provided for deployments of new radio communications networks using narrowband regions of unlicensed spectrum by utilizing UEs operating on bandwidths smaller than 20 MHz and without performing a CAT4 LBT by causing a BS serving to ensure the 20 MHz bandwidth in which those UEs are to transmit is available. The BS arranges random access opportunities for the UEs in which the UEs can transmit after performing a CAT1 or CAT2 LBT. The BS also checks out channel occupancy times (COTs) by performing CAT4 LBTs for scheduled uplink transmissions by the UEs.

According to aspects of the present disclosure, a UE whose operating bandwidth is smaller than 20 MHz may use a 20 MHz energy detector to detect received energy in a 20 MHz bandwidth and, if the detected energy is below a threshold, determine that the 20 MHz bandwidth is available for transmissions. The UE can then transmit and/or receive signal(s) over a bandwidth smaller than 20 MHz.

In aspects of the present disclosure, a base station (e.g., a gNB) may indicate in a physical broadcast channel (PBCH) that the BS is capable of supporting UEs that have an operating bandwidth smaller than 20 MHz and use a 20 MHz energy detector to detect received energy to determine if a 20 MHz bandwidth is available for transmissions. Additionally or alternatively, the BS may indicate in the PBCH that the BS is capable of supporting a subset of these UEs, e.g., the BS is capable of supporting UEs with a 10 MHz operating bandwidth but not UEs with a 5 MHz operating bandwidth.

According to aspects of the present disclosure, a base station (e.g., a gNB) may indicate in remaining minimum system information (RMSI) that the BS is capable of supporting UEs that have an operating bandwidth smaller than 20 MHz and use a 20 MHz energy detector to detect received energy to determine if a 20 MHz bandwidth is available for transmissions. Additionally or alternatively, the BS may indicate in the PBCH that the BS is capable of supporting a subset of these UEs, e.g., the BS is capable of supporting UEs with a 10 MHz operating bandwidth but not UEs with a 5 MHz operating bandwidth.

In aspects of the present disclosure, a BS (e.g., a gNB) may configure a smaller-than-20 MHz random access opportunity for UEs that have an operating bandwidth smaller than 20 MHz and use a 20 MHz energy detector to detect received energy to determine if a 20 MHz bandwidth is available for transmissions.

According to aspects of the present disclosure, a UE that has an operating bandwidth smaller than 20 MHz and uses a 20 MHz energy detector to detect received energy to determine if a 20 MHz bandwidth is available for transmissions may perform a CAT4 LBT in order to determine a 20 MHz bandwidth is available for the UE to start a random access procedure, i.e., transmit message 1 (Msg1) of the random access procedure.

In aspects of the present disclosure, after performing a successful random access procedure, a UE that has an operating bandwidth smaller than 20 MHz and uses a 20 MHz energy detector to detect received energy to determine if a 20 MHz bandwidth is available for transmissions may report its capabilities to the network (e.g., to a BS of the network) when the UE requests radio resource control (RRC) connection establishment from the network.

According to aspects of the present disclosure, a BS, which indicates a capability to support a UE that has an operating bandwidth smaller than 20 MHz and uses a 20 MHz energy detector to detect received energy to determine if a 20 MHz bandwidth is available for transmissions, may configure a triggered random access opportunity for such a UE, if the UE is not allowed (e.g., due to a network configuration) to conduct a CAT4 LBT in order to determine a 20 MHz bandwidth is available for the UE to start a random access procedure. In triggering the random access opportunity, the BS checks out a COT (i.e., reserves the bandwidth for a period of time) and then transmits a downlink control information (DCI) indicating occurrence of a dynamic random access opportunity for the UE(s). The BS may configure the random access opportunity and the COT so that a UE performing a random access procedure with the BS can transmit message 3 (Msg3) of the random access procedure within the COT checked out by the BS.

In aspects of the present disclosure, a BS, which indicates a capability to support a UE that has an operating bandwidth smaller than 20 MHz and uses a 20 MHz energy detector to detect received energy to determine if a 20 MHz bandwidth is available for transmissions, may check out a COT for a statically configured random access opportunity that ensures that any UE using the random access opportunity to perform a random access procedure can transmit Msg3 within the COT. A UE that receives the indication of the random access opportunity may perform a CAT2 or CAT1 LBT before transmitting Msg1 of the random access procedure.

According to aspects of the present disclosure, a UE, which has an operating bandwidth smaller than 20 MHz and uses a 20 MHz energy detector to detect received energy to determine if a 20 MHz bandwidth is available for transmissions, may start a random access procedure in a random access opportunity that is opportunistically within a BS-initiated COT, but the UE is required to transmit a preamble within a partitioned set of preambles (i.e., partitioned by a BS for use by the UE) as Msg1 of the random access procedure.

In aspects of the present disclosure, a BS (e.g., a gNB) may indicate in RMSI how a UE may identify a BS-initiated COT, e.g., by use of a corresponding radio network temporary identifier (RNTI) to mask a DCI, as well as prepare the DCI within a smaller than 20 MHz BW for reception by UEs that receive on a bandwidth smaller than 20 MHz.

According to aspects of the present disclosure, an NR-U UE with a typical (i.e., not smaller than 20 MHz) operating bandwidth (e.g., 100 MHz) may be configured (e.g., by a BS) to transmit an UL transmission in a bandwidth smaller than 20 MHz. A UE that may be so configured may report its capability to the network (e.g., in a capabilities report to a BS).

In aspects of the present disclosure, a UE with a typical operating bandwidth that may be configured to transmit an UL transmission in a bandwidth smaller than 20 MHz may perform a random access procedure in a random access opportunity within a COT checked out by a base station, as previously described. According to aspects of the present disclosure, preambles for use in the random access procedure may be partitioned (e.g., by a BS) between UEs that have an operating bandwidth smaller than 20 MHz and UEs that have a larger operating bandwidth, but have been configured to transmit an uplink transmission in a smaller than 20 MHz bandwidth.

According to aspects of the present disclosure, UEs that have an operating bandwidth smaller than 20 MHz and UEs that have a larger operating bandwidth, but have been configured to transmit an uplink transmission in a smaller than 20 MHz bandwidth, may be scheduled (e.g., by a BS) to transmit uplink transmissions in a same period (e.g., a slot) within a 20 MHz or smaller bandwidth using FDMA. For example, a BS may schedule a UE that has an operating bandwidth smaller than 20 MHz and a UE that has a larger operating bandwidth, but has been configured to transmit an uplink transmission in a smaller than 20 MHz bandwidth, to both transmit during one slot by assigning them to different 5 MHz bandwidths within a single 20 MHz bandwidth.

In aspects of the present disclosure, a UE that has a larger than 20 MHz operating bandwidth may access the entire operating bandwidth if the UE performs a CAT4 LBT.

According to aspects of the present disclosure, after checking out a COT using a CAT4 LBT (i.e., as described above), a UE that has a larger than 20 MHz operating bandwidth may share the COT to one or more UEs that have an operating bandwidth smaller than 20 MHz in an FDMA scheme. To facilitate this sharing, the UE that is checking out the COT may include a COT initial signal within the smaller than 20 MHz BW to be shared out.

In aspects of the present disclosure, a UE checking out a COT and sharing the bandwidth with other UEs (i.e., as described above) may use a smaller than default energy detection threshold in performing the described CAT4 LBT, e.g., a −82 dBm energy detection threshold instead of a typical −72 dBm energy detection threshold for a 23 dBm transmission power.

According to aspects of the present disclosure, whether COT sharing (i.e., as described above) is allowed in a network may be indicated by the network (e.g., by a base station of the network) via one or more of an RRC message, a medium access control control element (MAC-CE), or a DCI. A BS may be triggered to transmit such an indication by obtaining an indication of the presence of a UE (e.g., in a capabilities message from the UE) that can share a COT is being served by the BS.

In aspects of the present disclosure, an NR-U UE with a larger than 20 MHz operating bandwidth may check out a COT (e.g., using a CAT4 LBT) and share the COT with multiple UEs that each have an operating bandwidth smaller than 20 MHz and/or with multiple UEs that each have an operating bandwidth of 20 MHz or larger and have been configured to transmit an uplink transmission in a smaller than 20 MHz bandwidth. Such a UE that checks out and shares a COT with multiple other UEs may transmit parallel initial signals that are located within the smaller than 20 MHz bandwidth.

According to aspects of the present disclosure, a UE that has an operating bandwidth smaller than 20 MHz may receive (e.g., in an RRC message from a BS) an indication that a neighboring BS is capable of supporting the UE.

In aspects of the present disclosure, a UE that has an operating bandwidth of 20 MHz or larger and has been configured to transmit an uplink transmission in a smaller than 20 MHz bandwidth may receive (e.g., in an RRC message from a BS) an indication that a neighboring BS is capable of supporting the UE.

According to aspects of the present disclosure, a BS (e.g., a gNB) may send a backhaul message to other BSs the BS obtains an indication (e.g., in a capabilities message from a UE) that a UE that has an operating bandwidth smaller than 20 MHz is present in a service area of the BS.

In aspects of the present disclosure, a lower-cost UE for unlicensed deployment having an operating bandwidth smaller than 20 MHz may use an energy detector of the same BW as its operating bandwidth, i.e., a smaller than 20 MHz narrowband ED, to detect whether a bandwidth is available for transmissions (i.e., perform an LBT).

According to aspects of the present disclosure, a UE having an operating bandwidth smaller than 20 MHz and an energy detector of the same bandwidth may use a lower than default threshold in performing energy detection and/or with a longer energy detection time for a CAT2 LBT. Such a CAT2 LBT may be defined in a new communications specification definition.

In aspects of the present disclosure, a UE having an operating bandwidth smaller than 20 MHz and an energy detector of the same bandwidth may conduct a CAT4 LBT using the energy detector to determine if a bandwidth (i.e., a smaller than 20 MHz bandwidth) is available for transmissions before starting a random access procedure (i.e., transmitting a random access preamble) in the bandwidth.

According to aspects of the present disclosure, a BS (e.g., a gNB) may prepare a triggered random access opportunity (as previously described) or check out a COT for a preconfigured random access opportunity (as previously described), and a UE having an operating bandwidth smaller than 20 MHz and an energy detector of the same bandwidth may start a random access procedure in the triggered or preconfigured random access opportunity to gain access to the network. The UE may then report its capability (i.e., the UE's operating bandwidth and energy detector bandwidth are both smaller than 20 MHz) to the network (e.g., to a BS of the network).

In aspects of the present disclosure, to facilitate early capability differentiation, a network (e.g., a BS in the network) may configure a set of random access opportunities for UEs that have an operating bandwidth smaller than 20

MHz and a 20 MHz bandwidth energy detector and a different set of random access opportunities for UEs that have an operating bandwidth smaller than 20 MHz and an energy detector of the same bandwidth.

According to aspects of the present disclosure, to facilitate early capability differentiation, a network (e.g., a BS in the network) may partition a set of preambles for use within a random access opportunity for UEs that have an operating bandwidth smaller than 20 MHz and a 20 MHz bandwidth energy detector and a different set of preambles for UEs that have an operating bandwidth smaller than 20 MHz and an energy detector of the same bandwidth.

In aspects of the present disclosure, a UE that has an operating bandwidth smaller than 20 MHz and an energy detector of the same bandwidth may be configured to detect a Wi-Fi short training field (STF) in order to improve reliability of an LBT performed by the UE.

According to aspects of the present disclosure, a lower-cost UE for unlicensed deployment having an operating bandwidth smaller than 20 MHz may be implemented without a CAT4 LBT capability, but having remaining capabilities similar to an NR-U UE. For such a UE to perform a random access procedure, a BS (e.g., a gNB) may arrange a random access opportunity in which the UE may verify the bandwidth is available through a CAT2 or CAT1 LBT. The BS may trigger a dynamically configured random access opportunity (i.e., as previously described), the BS may check out a COT for a preconfigured random access opportunity, or the BS may reserve a set of preambles for use by such a UE and then attempt to check out a COT to cover Msg3 of the random access procedure after receiving a Msg1 of the random access procedure that includes a preamble in the reserved set of preambles. The BS also is informed to check out a COT for the UE for each UL transmission by the UE.

In aspects of the present disclosure, a UE having an operating bandwidth smaller than 20 MHz and implemented without a CAT4 LBT capability may be configured to transmit uplink transmissions on a bandwidth smaller than 20 MHz BW while a UE that can verify the 20 MHz bandwidth is available is scheduled for another part of the 20 MHz bandwidth and verifies the channel is available for the UE not having the CAT4 LBT capability.

According to aspects of the present disclosure, a transmitting entity that performs a category 1 (CAT1) LBT does not actually perform an LBT. A transmitting entity that performs a category 2 (CAT2) LBT performs an LBT without a random back-off, and the duration of time that the channel is sensed to be idle before the transmitting entity transmits is deterministic A transmitting entity that performs a category 3 (CAT3) LBT performs an LBT with a random back-off and a fixed contention window size. A transmitting entity that performs a category 4 (CAT4) LBT performs an LBT with a random back-off and a variable contention window size.

Figure 3:
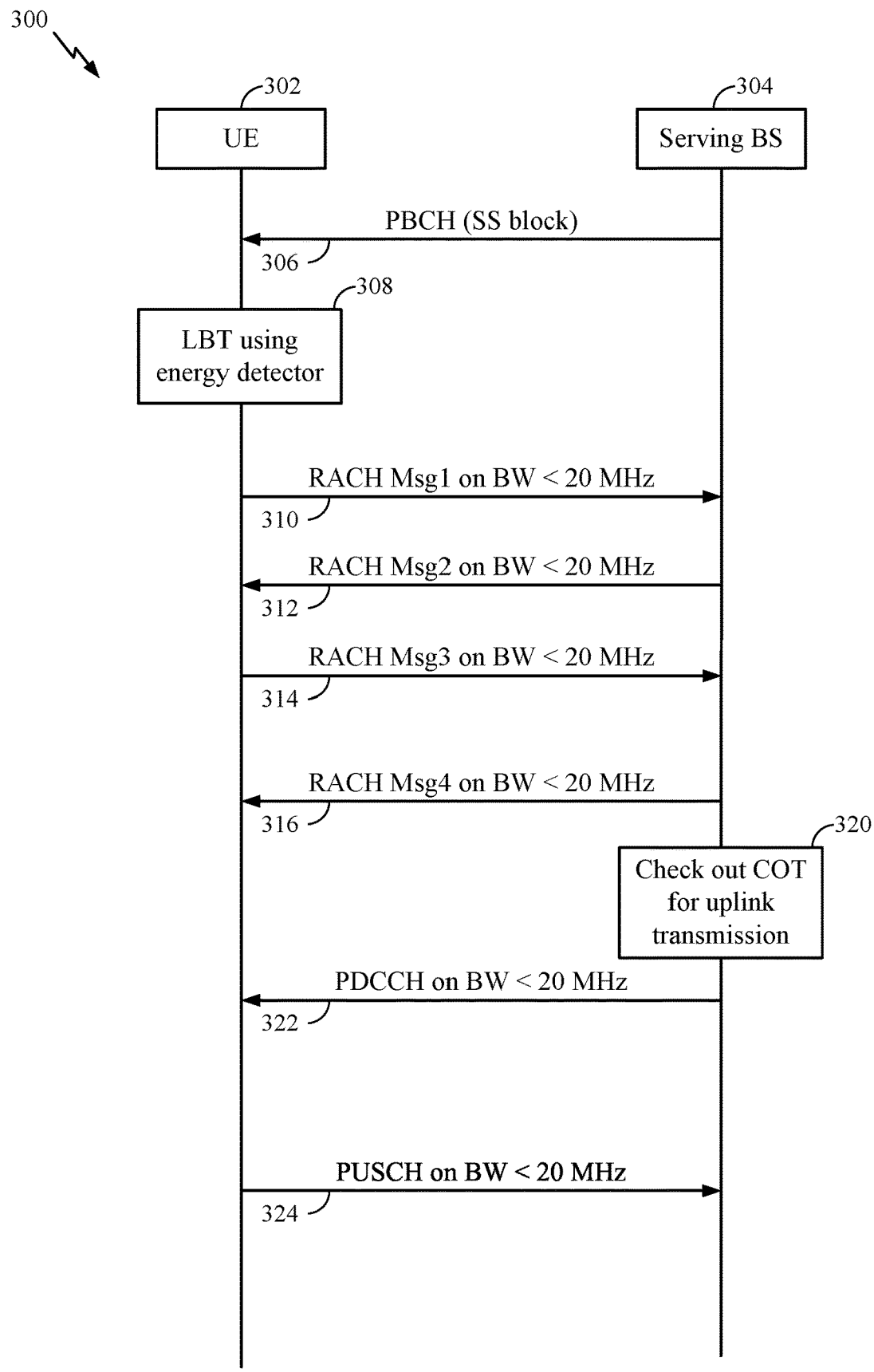
FIG. 3 is a call flow diagram illustrating example signaling for new radio (NR) communications in narrowband regions of unlicensed spectrum, in accordance with certain aspects of the present disclosure.

FIG. 3 is an exemplary call flow 300 between a UE 302 (e.g., UE 120a shown in FIGS. 1 and 2) and a BS 304 (e.g., BS 110a, shown in FIGS. 1 and 2), in accordance with aspects of the present disclosure. At 306, the BS transmits a PBCH, which may be part of a synchronization signal block (SSB), indicating that the BS is capable of supporting UEs with an operating bandwidth smaller than 20 MHz that use an energy detector with a 20 MHz bandwidth to verify that a 20 MHz bandwidth of unlicensed spectrum is available. At 308, UE uses an energy detector capable of detecting energy in a 20 MHz bandwidth to verify (i.e., performing an LBT) that a 20 MHz bandwidth of unlicensed spectrum is available. At 310, the UE transmits Msg1 of a random access procedure (i.e., a random access channel (RACH)) on a bandwidth smaller than 20 MHz that is within the 20 MHz bandwidth that the UE verified as available at 308. At 312, the BS transmits Msg2 of the random access procedure on a bandwidth smaller than 20 MHz. At 314, the UE replies to the Msg2 with a Msg3 of the random access procedure on the same bandwidth the UE used to transmit Msg1. At 316, the BS transmits Msg4 of the random access procedure on a bandwidth smaller than 20 MHz. At 320, the BS checks out a COT on a 20 MHz bandwidth for an uplink transmission from the UE. At 322, the BS transmits a PDCCH with a DCI allocating, for a PUSCH from the UE, resources of less than 20 MHz within the 20 MHz bandwidth for which the BS checked out the COT at block 320. At 324, the UE transmits the PUSCH on the resources allocated to the UE in the PDCCH of 322.

Figure 4:
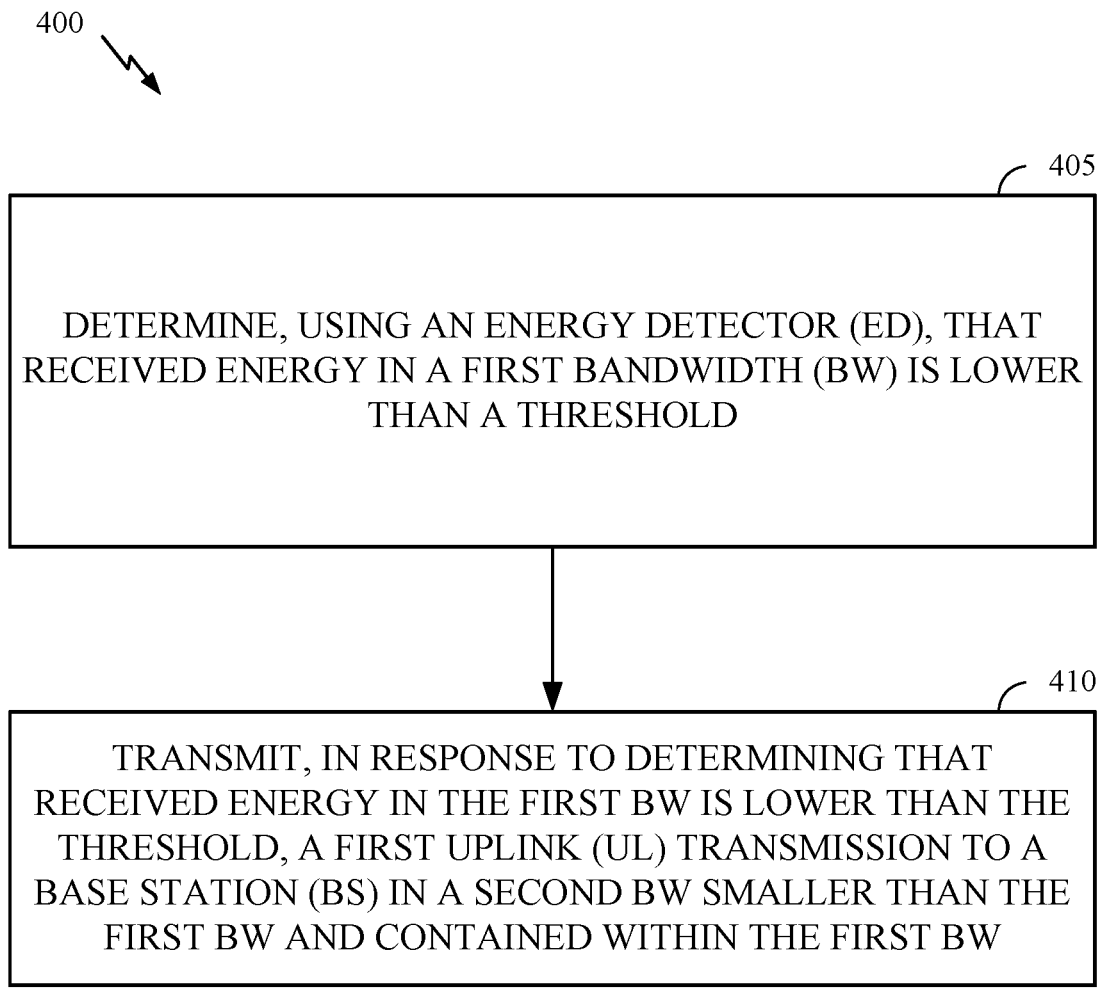
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as a UE 120a in the wireless communication network 100). Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 405, by the UE determining, using an energy detector (ED), that received energy in a first bandwidth (BW) is lower than a threshold. For example, UE 120a of FIGS. 1 and 2 may receive, via antennas 252a-252r, energy in a first BW. At block 405, the UE may use ED 259 to determine that the received energy in the first BW is lower than a threshold.

At block 410, operations 400 continue with the UE transmitting, in response to determining that received energy in the first BW is lower than the threshold, a first uplink (UL) transmission to a base station (BS) in a second BW smaller than the first BW and contained within the first BW. Continuing the example from above, in response to ED 259 determining that the received energy in the first BW is lower than the threshold, UE 120a may transmit, via antennas 252a-252r, a first UL transmission to BS 110a. The UE 120a may transmit the first UL transmission in a second BW smaller than the first BW and contained within the first BW.

The example from above may be further illustrated by reference to FIG. 3. At 308, the UE 302 may use an energy detector capable of detecting energy in a 20 MHz bandwidth to determine that received energy in the 20 MHz bandwidth is lower than a threshold. The UE may use the energy detector to determine (e.g., by performing an LBT) that the 20 MHz bandwidth of unlicensed spectrum is available.

Continuing the example from above, at 310, the UE transmits, in response to determining that received energy in the 20 MHz BW is lower than the threshold, a first uplink (UL) transmission to a base station (BS) 304 in a second BW smaller than the 20 MHz BW and contained within the 20 MHz BW. In performing block 410, the UE transmits Msg1 of a random access procedure (i.e., a random access channel (RACH)) on a bandwidth smaller than 20 MHz that is within the 20 MHz bandwidth that the UE verified as available at 308.

In aspects of the present disclosure, the first BW may be twenty megahertz (MHz).

According to aspects of the present disclosure, a UE may receive an indication from the BS that the BS supports UEs that detect received energy in the first BW and transmit in the second BW prior to performing operations 400. In aspects of the present disclosure, the indication may be received in a physical broadcast channel (PBCH). According to aspects of the present disclosure, the indication may be received in remaining minimum system information (RMSI) transmitted by the BS.

In aspects of the present disclosure, a UE performing operations 400 may receive, from the BS, an indication of a random access opportunity in the second BW.

According to aspects of the present disclosure, a UE performing operations 400 may perform a random access procedure with the BS and transmit a capability report to the BS indicating that the UE can only transmit a signal over the second BW or a third BW that is smaller than the first BW and can only receive a signal over a fourth BW smaller than the first BW.

In aspects of the present disclosure, a UE performing operations 400 may receive, from the BS, a downlink control information (DCI) commanding the UE to perform a random access procedure on resources in the second BW. The UE may receive, in remaining minimum system information (RMSI) from the BS, an indication of an identifier of a channel occupancy time (COT) and the DCI may be masked using the identifier.

According to aspects of the present disclosure, a UE performing operations 400 may receive an indication from the BS of a channel occupancy time (COT) and perform a random access procedure with the BS during the COT on resources in the second BW.

In aspects of the present disclosure, a UE performing operations 400 may receive, in remaining minimum system information (RMSI) from the BS, an indication of an identifier of the indicated COT and then receive, from the BS, a downlink control information (DCI) masked using the identifier.

According to aspects of the present disclosure, a UE performing operations 400 may receive an indication from the BS of a set of preambles to use for a first message (Msg1) of a random access procedure and transmit a preamble in the set of preambles as Msg1 of the random access procedure on resources in the second BW. In aspects of the present disclosure, the UE may receive, in remaining minimum system information (RMSI) from the BS, an indication of an identifier of a channel occupancy time (COT) and receive, from the BS, a downlink control information (DCI) masked using the identifier.

In aspects of the present disclosure, a UE performing operations 400 may receive a configuration indicating the UE is to determine the received energy in the first BW and transmit in the second BW. The UE may transmit a capabilities message to the BS indicating the UE is capable of detecting received energy in the first BW and transmitting in the second BW, and the configuration may be received by the UE in response to transmitting the capabilities message.

According to aspects of the present disclosure, a UE performing operations 400 may receive a downlink control information (DCI) scheduling the UE to transmit a second transmission in the second BW during a slot, and another UE may be scheduled to transmit a third transmission in the first BW during the slot.

In aspects of the present disclosure, a UE performing operations 400 may receive a downlink control information (DCI) scheduling the UE to transmit the first UL transmission.

According to aspects of the present disclosure, a UE performing operations 400 may perform a category 4 (CAT4) listen before transmitting (LBT) procedure in the first BW. Performing the CAT4 LBT may include transmitting a first channel occupancy time (COT) initial signal in a third BW within the first BW and different from the second BW, and transmitting the first COT initial signal may indicate that the UE will share the third BW with a second UE during the COT. In aspects of the present disclosure, the threshold may be less than a default threshold (e.g., a default threshold defined in a wireless communications standard) for performing a CAT4 LBT. According to aspects of the present disclosure, the UE may receive an indication from the BS that COT sharing is allowed. According to aspects of the present disclosure, performing the CAT4 LBT procedure may include transmitting a second COT initial signal in a fourth BW within the first BW and different from the second BW and the third BW, and transmitting the second COT initial signal may indicate that the UE will share the fourth BW with a third UE during the COT.

In aspects of the present disclosure, a UE performing operations 400 may receive, from the BS, a radio resource control (RRC) message indicating that another BS is capable of supporting the UE.

According to aspects of the present disclosure, the ED of a UE performing operations 400 may be configured to ignore received energy in a portion of the first BW outside of the second BW. In aspects of the present disclosure, the threshold (e.g., the energy detection threshold) may be less than a default threshold (e.g., a default threshold from a wireless communications standard) associated with the first BW. In aspects of the present disclosure, the UE may perform a category 4 (CAT4) listen before transmitting (LBT) procedure in the second BW. According to aspects of the present disclosure, the UE may receive, from the BS, an indication of a random access opportunity in the second BW and perform a random access procedure with the BS on resources in the second BW. In aspects of the present disclosure, the UE may transmit a capabilities message (e.g., a capabilities report) to the BS indicating the ED is configured to ignore received energy outside of the second BW, subsequent to performing the random access procedure. According to aspects of the present disclosure, the UE may receive an indication from the BS of a set of preambles to use for a first message (Msg1) of the random access procedure and transmit a preamble in the set of preambles as Msg1 of the random access procedure on resources in the second BW. In aspects of the present disclosure, the UE may determine that the second BW does not contain a Wi-Fi short training field (STF).

Figure 5:
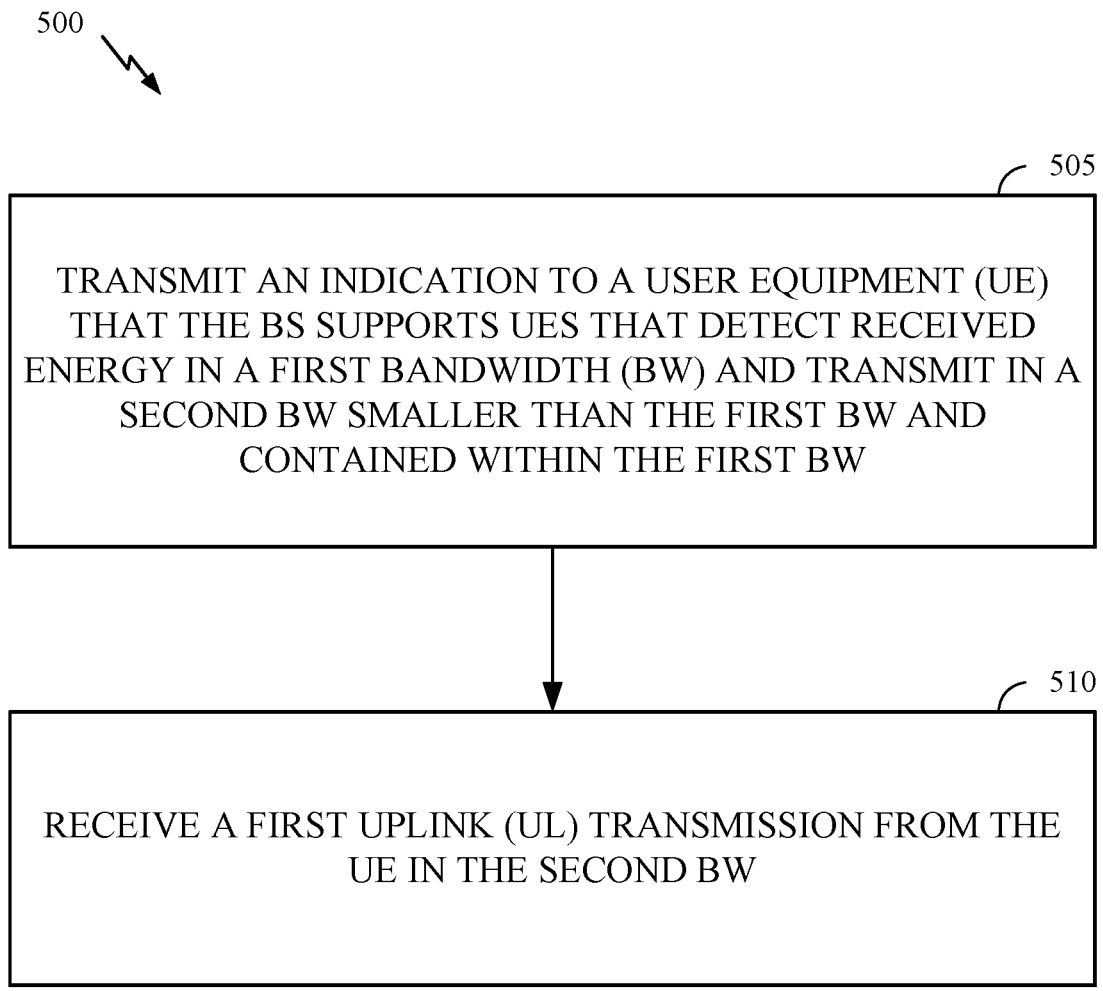
FIG. 5 is a flow diagram illustrating example operations for wireless communication by a BS, in accordance with certain aspects of the present disclosure.

FIG. 5 is a flow diagram illustrating example operations 500 for wireless communication, in accordance with certain aspects of the present disclosure. The operations 500 may be performed, for example, by a BS (e.g., such as the BS 110a in the wireless communication network 100). The operations 500 may be complimentary operations by the BS to the operations 500 performed by the UE. Operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 500 may begin, at block 505, by the BS transmitting an indication to a user equipment (UE) that the BS supports UEs that detect received energy in a first bandwidth (BW) and transmit in a second BW smaller than the first BW and contained within the first BW. For example, BS 110a of FIGS. 1 and 2 may transmit, via antennas 234a-234t, an indication to UE 120a that the BS supports UEs that detect received energy in a first BW and transmit in a second BW smaller than the first BW and contained within the first BW.

At block 510, operations 510 continue with the BS receiving a first uplink (UL) transmission from the UE in the second BW. Continuing the example from above, BS 110a may receive, via antennas 234a-234t, a first UL transmission from UE 120a. The first UL transmission may be transmitted in the second BW.

The example from above may be further illustrated by reference to FIG. 3. At 306, the BS 304 may transmit a PBCH, which may be part of a synchronization signal block (SSB), indicating that the BS is capable of supporting UEs with an operating bandwidth smaller than 20 MHz that use an energy detector with a 20 MHz bandwidth to verify that a 20 MHz bandwidth of unlicensed spectrum is available.

Continuing the example from above, at 310, the BS may receive Msg1 of a random access procedure (i.e., a random access channel (RACH)) on a bandwidth smaller than 20 MHz that is within the 20 MHz bandwidth that the UE verified as available at 308.

In aspects of the present disclosure, the first BW may be twenty megahertz (MHz).

According to aspects of the present disclosure, a BS performing operations 500 may transmit the indication in a physical broadcast channel (PBCH).

In aspects of the present disclosure, a BS performing operations 500 may transmit the indication in remaining minimum system information (RMSI).

According to aspects of the present disclosure, a BS performing operations 500 may transmit an indication of a random access opportunity in the second BW.

In aspects of the present disclosure, a BS performing operations 500 may perform a random access procedure (e.g., receive and reply to random access messages) with the UE and receive a capability report from the UE indicating that the UE can only transmit a signal over the second BW or a third BW that is smaller than the first BW and can only receive a signal over a fourth BW smaller than the first BW.

According to aspects of the present disclosure, a BS performing operations 500 may transmit a downlink control information (DCI) commanding the UE to perform a random access procedure on resources in the second BW. In aspects of the present disclosure, the BS may transmit, in remaining minimum system information (RMSI), an indication of an identifier of a channel occupancy time (COT) and mask the DCI using the identifier.

In aspects of the present disclosure, a BS performing operations 500 may check out a channel occupancy time (COT), transmit (e.g., to the UE) an indication of the COT, and perform a random access procedure with the UE during the COT on resources in the second BW. According to aspects of the present disclosure, the BS may transmit, in remaining minimum system information (RMSI), an indication of an identifier of the COT and transmit a downlink control information (DCI) masked using the identifier.

In aspects of the present disclosure, a BS performing operations 500 may transmit an indication of a set of preambles to use for a first message (Msg1) of a random access procedure and receive from the UE a preamble in the set of preambles as Msg1 of the random access procedure on resources in the second BW. According to aspects of the present disclosure, the BS may transmit, in remaining minimum system information (RMSI), an indication of an identifier of a channel occupancy time (COT) and transmit a downlink control information (DCI) masked using the identifier.

According to aspects of the present disclosure, a BS performing operations 500 may transmit a configuration indicating the UE is to determine the received energy in the first BW and transmit in the second BW. In aspects of the present disclosure, the BS may receive a capabilities message (e.g., a capabilities report) from the UE indicating the UE is capable of detecting received energy in the first BW and transmitting in the second BW and transmit the configuration in response to receiving the capabilities message.

In aspects of the present disclosure, a BS performing operations 500 may transmit a downlink control information (DCI) scheduling the UE to transmit a second transmission in the second BW during a slot and transmit another DCI scheduling another UE to transmit a third transmission in the first BW during the slot.

According to aspects of the present disclosure, a BS performing operations 500 may transmit a downlink control information (DCI) scheduling the UE to transmit the first UL transmission.

In aspects of the present disclosure, a BS performing operations 500 may transmit an indication to the UE that channel occupancy time (COT) sharing is allowed.

According to aspects of the present disclosure, a BS performing operations 500 may transmit a radio resource control (RRC) message indicating that another BS is capable of supporting the UE.

In aspects of the present disclosure, a BS performing operations 500 may transmit, to the UE, an indication of a random access opportunity in the second BW and perform a random access procedure with the UE on resources in the second BW. According to aspects of the present disclosure, the BS may receive a capabilities message from the UE indicating the UE is configured to ignore received energy outside of the second BW, subsequent to performing the random access procedure. In aspects of the present disclosure, the BS may transmit an indication to the UE of a set of preambles to use for a first message (Msg1) of the random access procedure and receive, from the UE, a preamble in the set of preambles as Msg1 of the random access procedure on resources in the second BW.

Figure 6:
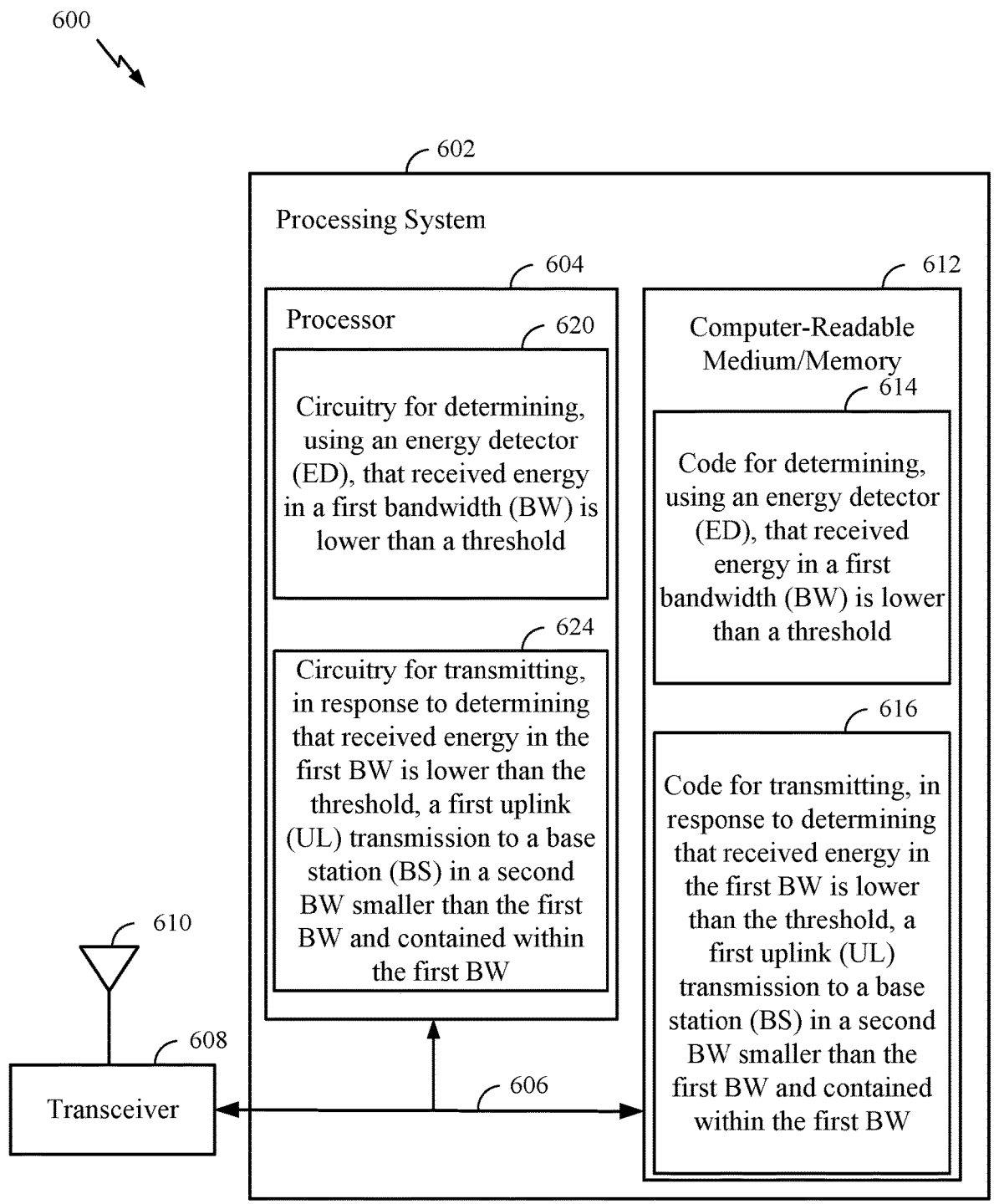
FIG. 6 illustrates a communications device that may include various components configured to perform the operations illustrated in FIG. 4, in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 4. The communications device 600 includes a processing system 602 coupled to a transceiver 608. The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/ memory 612 is configured to store instructions (e.g., computer-executable code) that when executed by the processor 604, cause the processor 604 to perform the operations illustrated in FIG. 4, or other operations for performing the various techniques discussed herein for new radio (NR) communications in narrowband regions of unlicensed spectrum. In certain aspects, computer-readable medium/memory 612 stores code 614 for determining, using an energy detector (ED), that received energy in a first bandwidth (BW) is lower than a threshold; and code 616 for transmitting, in response to determining that received energy in the first BW is lower than the threshold, a first uplink (UL) transmission to a base station (BS) in a second BW smaller than the first BW and contained within the first BW. In certain aspects, the processor 604 has circuitry configured to implement the code stored in the computer-readable medium/memory 612. The processor 604 includes circuitry 620 for determining, using an energy detector (ED), that received energy in a first bandwidth (BW) is lower than a threshold; and circuitry 624 for transmitting, in response to determining that received energy in the first BW is lower than the threshold, a first uplink (UL) transmission to a base station (BS) in a second BW smaller than the first BW and contained within the first BW.

Figure 7:
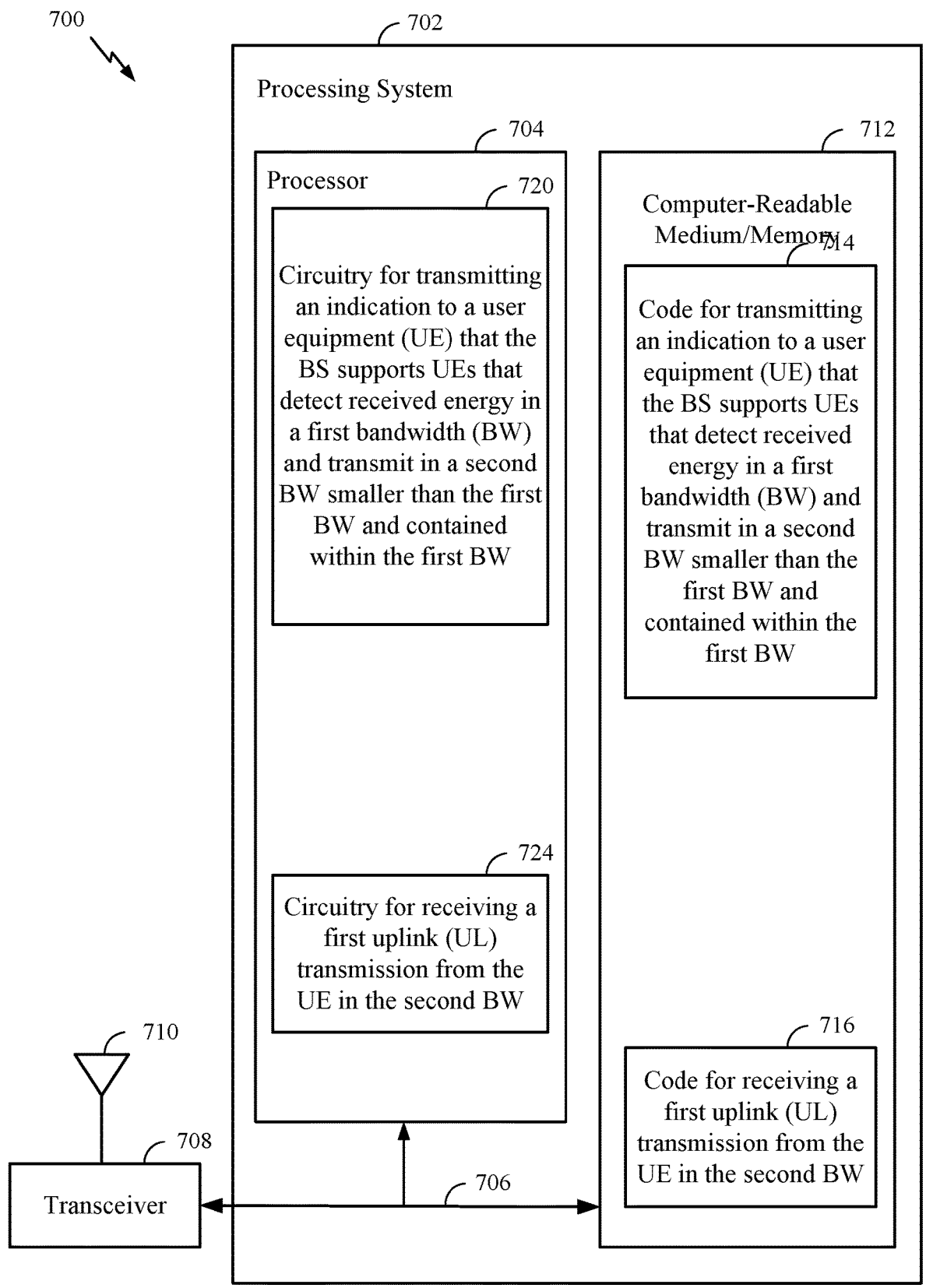
FIG. 7 illustrates a communications device that may include various components configured to perform the operations illustrated in FIG. 5, in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein for new radio (NR) communications in narrowband regions of unlicensed spectrum. In certain aspects, computer-readable medium/memory 712 stores code 714 for transmitting an indication to a user equipment (UE) that the BS supports UEs that detect received energy in a first bandwidth (BW) and transmit in a second BW smaller than the first BW and contained within the first BW; and code 716 for receiving an uplink (UL) transmission from the UE in the second BW. In certain aspects, the processor 704 has circuitry configured to implement the code stored in the computer-readable medium/memory 712. The processor 704 includes circuitry 720 for transmitting an indication to a user equipment (UE) that the BS supports UEs that detect received energy in a first bandwidth (BW) and transmit in a second BW smaller than the first BW and contained within the first BW; and circuitry 724 for receiving an uplink (UL) transmission from the UE in the second BW.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and B S, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein, for example, instructions for performing the operations described herein and illustrated in FIG. 4 and/or FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
a processor configured to:
receive an indication from a base station (BS) that the BS supports user equipments (UEs) that detect received energy in a first bandwidth (BW) and transmit in a second BW smaller than the first BW and contained within the first BW;
determine, using an energy detector (ED), that received energy in the first BW is lower than a threshold; and
transmit, in response to determining that received energy in the first BW is lower than the threshold, a first uplink (UL) transmission to the BS in the second BW; and
a memory coupled with the processor.

2. The apparatus of claim 1, wherein the processor is configured to receive the indication in remaining minimum system information (RMSI) transmitted by the BS.

3. The apparatus of claim 1, wherein the processor is further configured to receive, from the BS, an indication of a random access opportunity in the second BW.

4. The apparatus of claim 1, wherein the processor is further configured to receive, from the BS, a downlink control information (DCI) commanding the apparatus to perform a random access procedure on resources in the second BW.

5. The apparatus of claim 4, wherein the processor is further configured to:
receive, in remaining minimum system information (RMSI) from the BS, an indication of an identifier of a channel occupancy time (COT); and
receive, from the BS, a downlink control information (DCI) masked using the identifier.

6. The apparatus of claim 1, wherein the processor is further configured to:
receive an indication from the BS of a channel occupancy time (COT); and
perform a random access procedure with the BS during the COT on resources in the second BW.

7. The apparatus of claim 6, wherein the processor is further configured to:
receive, in remaining minimum system information (RMSI) from the BS, an indication of an identifier of the indicated COT; and
receive, from the BS, a downlink control information (DCI) masked using the identifier.

8. The apparatus of claim 1, wherein the processor is further configured to:
receive an indication from the BS of a set of preambles to use for a first message (Msg1) of a random access procedure; and
transmit a preamble in the set of preambles as Msg1 of the random access procedure on resources in the second BW.

9. The apparatus of claim 8, wherein the processor is further configured to:
receive, in remaining minimum system information (RMSI) from the BS, an indication of an identifier of a channel occupancy time (COT); and
receive, from the BS, a downlink control information (DCI) masked using the identifier.

10. The apparatus of claim 1, wherein the processor is further configured to:
receive a configuration indicating the apparatus is to determine the received energy in the first BW and transmit in the second BW; and
transmit a capabilities message to the BS indicating the apparatus is capable of detecting received energy in the first BW and transmitting in the second BW, wherein the configuration is received by the apparatus in response to transmitting the capabilities message.

11. The apparatus of claim 1, wherein the ED is configured to ignore received energy in a portion of the first BW outside of the second BW.

12. The apparatus of claim 11, wherein the threshold is less than a default threshold associated with the first BW.

13. The apparatus of claim 11, wherein the processor is further configured to:
receive, from the BS, an indication of a random access opportunity in the second BW; and
perform a random access procedure with the BS on resources in the second BW.

14. The apparatus of claim 13, wherein the processor is further configured to transmit a capabilities message to the BS indicating the ED is configured to ignore received energy outside of the second BW, subsequent to performing the random access procedure.

15. The apparatus of claim 13, wherein the processor is further configured to:
receive an indication from the BS of a set of preambles to use for a first message (Msg1) of the random access procedure; and
transmit a preamble in the set of preambles as Msg1 of the random access procedure on resources in the second BW.

16. The apparatus of claim 1, wherein the processor is not capable of transmitting or receiving a signal having a bandwidth greater than or equal to the first bandwidth.

17. An apparatus for wireless communications, comprising:
a processor configured to:
perform a random access procedure with a base station (BS);
determine, using an energy detector (ED), that received energy in a first bandwidth (BW) is lower than a threshold;

transmit a capability report to the BS indicating that the apparatus can only transmit a signal over a second BW that is smaller than the first BW and contained within the first BW or a third BW that is smaller than the first BW, and can only receive a signal over a fourth BW smaller than the first BW; and transmit, in response to determining that received energy in the first BW is lower than the threshold, a first uplink (UL) transmission to the BS in the second BW; and a memory coupled with the processor.

18. An apparatus for wireless communications, comprising:

a processor configured to:
  determine, using an energy detector (ED), that received energy in a first bandwidth (BW) is lower than a threshold;
  transmit, in response to determining that received energy in the first BW is lower than the threshold, a first uplink (UL) transmission to a base station (BS) in a second BW smaller than the first BW and contained within the first BW; and
  receive a downlink control information (DCI) scheduling the apparatus to transmit a second UL transmission in the second BW during a slot, wherein another apparatus is scheduled to transmit a third UL transmission in the first BW during the slot; and
a memory coupled with the processor.

19. An apparatus for wireless communications, comprising:

a processor configured to:
  determine, using an energy detector (ED), that received energy in a first bandwidth (BW) is lower than a threshold;
  perform a category 4 (CAT4) listen before transmitting (LBT) procedure in the first BW, wherein the processor is configured to perform the CAT4 LBT by transmitting a first channel occupancy time (COT) initial signal in a second BW contained within the first BW, wherein transmitting the first COT initial signal indicates that the apparatus will share the second BW with a first user equipment (UE) during the COT; and
  transmit, in response to determining that received energy in the first BW is lower than the threshold, a first uplink (UL) transmission to a base station (BS) in a third BW different from the second BW, smaller than the first BW, and contained within the first BW; and
a memory coupled with the processor.

20. The apparatus of claim 19, wherein the threshold is less than a default threshold for performing a CAT4 LBT.

21. The apparatus of claim 19, wherein the processor is further configured to receive an indication from the BS that COT sharing is allowed.

22. The apparatus of claim 19, wherein the processor is configured to perform the CAT4 LBT procedure by transmitting a second COT initial signal in a fourth BW within the first BW and different from the second BW and the third BW, wherein transmitting the second COT initial signal indicates that the apparatus will share the fourth BW with a second UE during the COT.

23. An apparatus for wireless communications, comprising:

a processor configured to:
  receive, from a base station (BS), a radio resource control (RRC) message indicating that another BS is capable of supporting the apparatus;
  determine, using an energy detector (ED), that received energy in a first bandwidth (BW) is lower than a threshold; and
  transmit, in response to determining that received energy in the first BW is lower than the threshold, a first uplink (UL) transmission to the other BS in a second BW smaller than the first BW and contained within the first BW; and
a memory coupled with the processor.

24. An apparatus for wireless communications, comprising:

a processor configured to:
  transmit an indication to a user equipment (UE) that the apparatus supports UEs that detect received energy in a first bandwidth (BW) and transmit in a second BW smaller than the first BW and contained within the first BW; and
  receive a first uplink (UL) transmission from the UE in the second BW; and
a memory coupled with the processor.

25. The apparatus of claim 24, wherein the processor is further configured to transmit an indication of a random access opportunity in the second BW.

26. The apparatus of claim 24, wherein the processor is further configured to:
  check out a channel occupancy time (COT);
  transmit an indication of the COT; and
  perform a random access procedure with the UE during the COT on resources in the second BW.

27. The apparatus of claim 24, wherein the processor is further configured to transmit an indication to the UE that channel occupancy time (COT) sharing is allowed.

* * * * *